Sept. 2, 1969
H. LAUB
3,464,464
BALANCED VACUUM FILLER
Filed Oct. 23, 1965
2 Sheets-Sheet 1
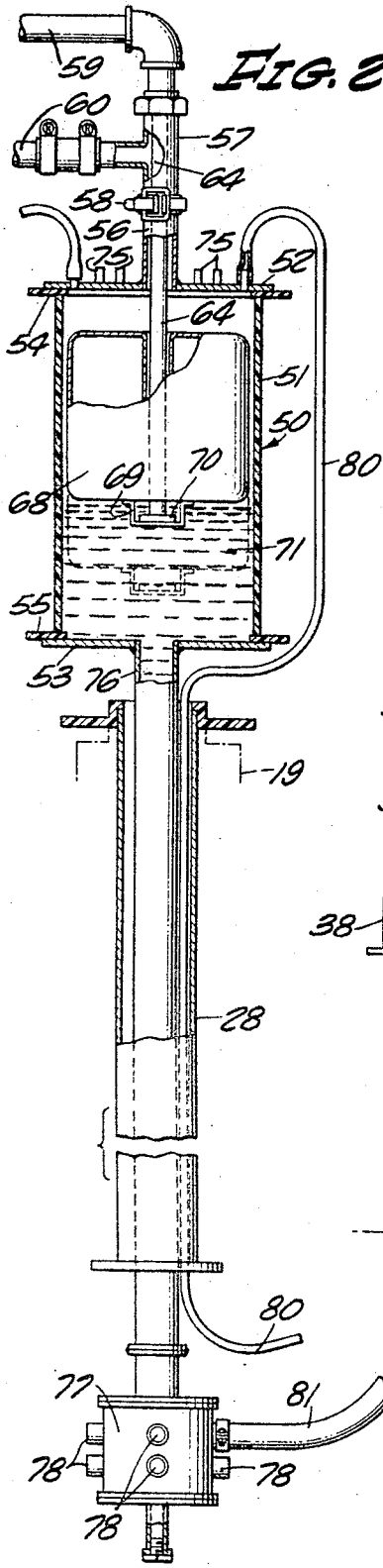
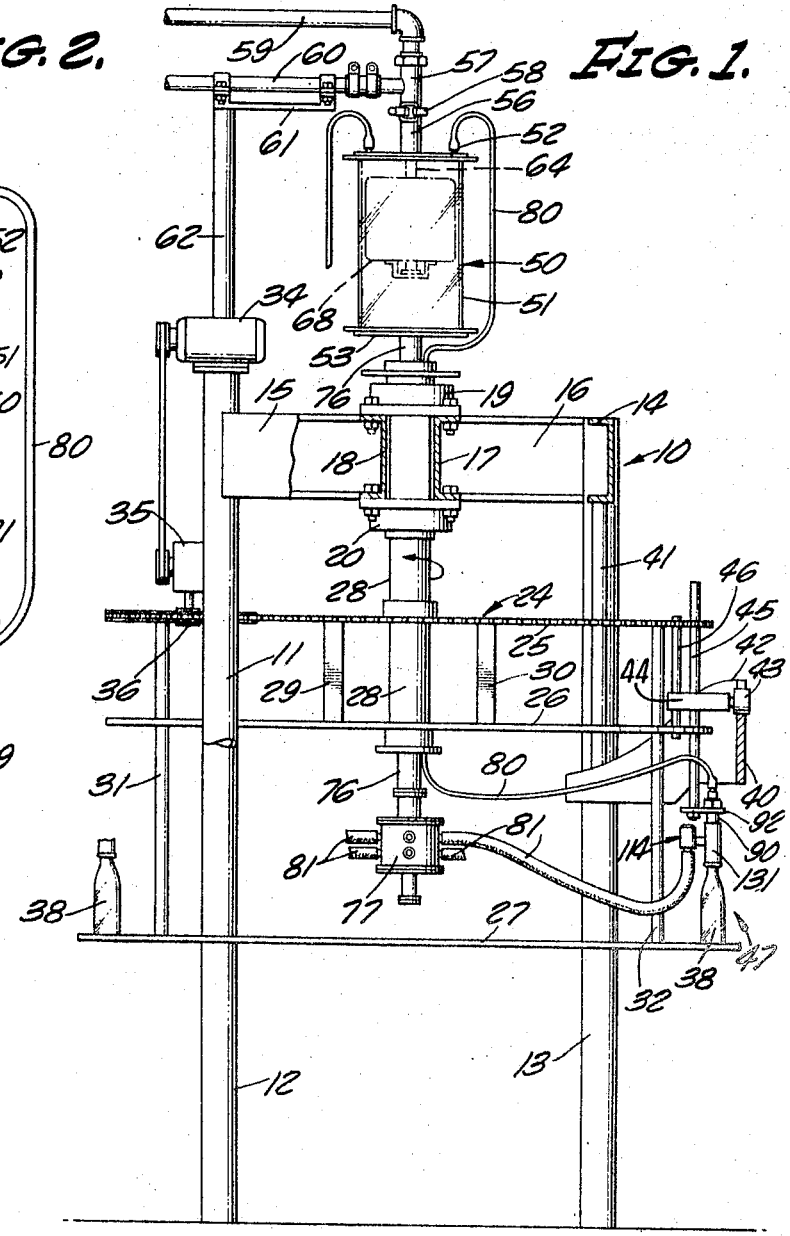
INVENTOR.
HERMAN LAUB
BY Lyon & Lyon
ATTORNEYS

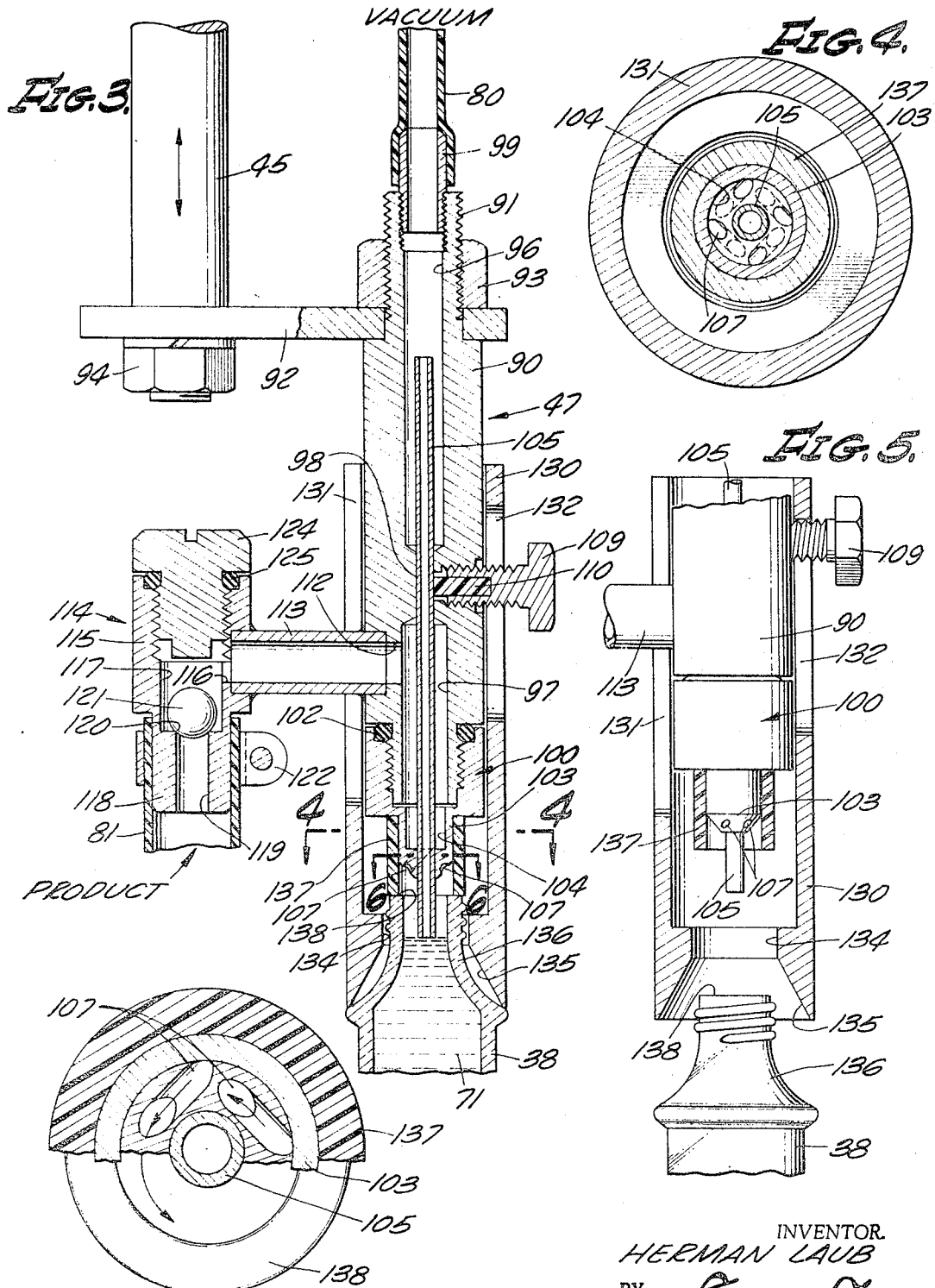

United States Patent Office 3,464,464
Patented Sept. 2, 1969

3,464,464
BALANCED VACUUM FILLER
Herman Laub, 244 N. San Marino Ave.,
San Gabriel, Calif. 91775
Filed Oct. 23, 1965, Ser. No. 503,061
Int. Cl. B65b 31/02
U.S. Cl. 141—59                              3 Claims

ABSTRACT OF THE DISCLOSURE

A receptacle filling apparatus including a container for holding a supply of product above receptacles, and filler valves for evacuating and filling receptacles. A vacuum source is coupled with the container for causing the same to be filled to a predetermined level with a product and a chamber of reduced pressure exists above the product level. This chamber is coupled with the filler valves for evacuating receptacles and for causing the product to be drawn into the receptacles from the container. Each filler valve includes a plurality of liquid outlet passageways which are inclined to provide a swirl-type feed of the product to the interior wall of a receptacle.

---

This invention relates to receptacle filling apparatus and more particularly to improved balanced filling apparatus.

Various devices and apparatus have been devised for filling receptacles, such as bottles and the like, in an automatic manner. Typical machines may include a moving bed or rotating table for transporting the receptacles past a filling device or apparatus, or moving both the receptacle and filling device until the receptacle is filled. Typically, various mechanical and pneumatic devices are provided for controlling the filling of the receptacles, and these devices generally are relatively complex, costly and troublesome. For example, in many prior machines of this nature supply and overflow pumps and controls therefor as well as complex valve devices have been required.

Accordingly, it is an object of the present invention to provide an improved receptacle filling apparatus.

It is an additional object of this invention to provide a balanced receptacle filling device.

A further object of this invention is to provide a receptacle filling device which does not under or over fill a receptacle, and which enables adjustment of the fill level.

Another object of this invention is to provide an improved receptacle filling device in which a pressure unbalance causes termination of flow into the receptacle.

A still further object of this invention is to provide a valve device for filling containers to a selectable predetermined level in a simple and reliable manner.

An additional object of this invention is to provide a receptacle filling device which does not require mechanical valve operating mechanisms.

A yet further object of this invention is to provide an improved receptacle filling device which operates automatically to fill a receptacle after the receptacle is at least partially evacuated thereby.

These and other objects and features of this invention will become more apparent upon a consideration of the following description taken in conjunction with the drawings in which:

FIGURE 1 is a side elevational view, partially in section, of a receptacle filling machine incorporating the concepts of the present invention;

FIGURE 2 is a side elevational view, partially in section, showing a portion of the machine of FIGURE 1 in greater detail;

FIGURE 3 is a side sectional view of a filler valve constructed in accordance with the teachings of the present invention;

FIGURE 4 is a cross sectional view of the valve taken along a line 4—4 of FIGURE 3;

FIGURE 5 is a partial elevational view of the filler valve shown in FIGURE 3; and FIGURE 6 is a view of the valve taken along a line 6—6 of FIGURE 3.

A receptacle filling device which is substantially improved over those of the prior art and which relates to the same art as the present invention is disclosed in my co-pending U.S. patent application Ser. No. 313,548, entitled "Receptacle Filling Apparatus" filed Oct. 3, 1963, now Patent No. 3,263,711, the disclosure of which is incorporated herein by reference.

Referring now to the drawings, and first to FIGURE 1, a receptacle filling machine incorporating the concepts of the present invention is illustrated. Although not shown in great detail, a machine of this nature generally includes a frame for supporting the filling apparatus as well as transporting means for carrying and moving the receptacles to be filled. The machine illustrated in FIGURE 1 includes a frame 10 having legs at the corners therof, only three legs 11 through 13 being shown for convenience of illustration. The frame 10 further includes suitable cross members affixed to the legs for supporting the filling and transporting apparatus. Thus, there is illustrated in FIGURE 1 front and side channel membrs 14, and 15 and 16, respectively, as well as intermediate channel members 17 and 18 which support bearing housings 19 and 20 substantially at the center of the frame 10. The bearing housings 19 and 20 allow the filling and transporting apparatus to rotate with respect to the frame 10.

The transporting apparatus is indicated generally by a reference numeral 24, and includes three platforms 25 through 27. The platforms 25 and 26 are affixed substantially at the center thereof to a tubular sleeve 28 which freely rotates in the bearing housings 19 and 20. These two platforms 25 and 26 further are secured together by a number of brackets, such as by brackets 29 and 30. A plurality of rods (only two rods 31 and 32 being shown for simplicity of illustration) are affixed to the three platforms 25 through 27. The upper platform 25 may be driven in any conventional manner, such as by a motor 34 and gear box 35, or the like. For example, the periphery of the platform 25 may have a plurality of teeth thereon driven by a mating gear 36, or a chain-type drive may be provided. Rotation of the platform 25 by the motor 34 thus rotates the platforms 26 and 27. The platform 26 carries a plurality of filler valves; whereas the platform 27 carries a plurality of receptacles, such as a bottle 38, as they are being filled by the filler valves. The bottles 38 may be fed onto the platform 27 in any conventional manner, such as by means of a star gear which may be driven from the platform 25.

A cam 40 is supported by the channel member 14 by means of a plurality of cam supporting rods, such as a rod 41. The cam 40 has an upper surface 42 upon which a cam roller 43 rides to raise and lower a bar 44 and thus a valve support rod 45 affixed thereto. A rod 46 is affixed to the platforms 25 and 26 and extends through a bore in the bar 44 for allowing the bar to freely move up and down while maintaining the alignment of the wheel 43 with respect to the cam 40. The cam 40 and cam follower mechanism including the roller 43, bar 44 and rod 45, serve to raise a filler valve device, generally designated by a reference numeral 47, as a filled receptacle is ready to exit from the platform 27 and serve to lower the device to engage the top of a receptacle as it is fed onto the platform 27. It will be appreciated that a plurality of receptacles 38 are fed onto the platform 27 in a serial fashion and that a plurality of filler valve devices 47 serve to fill the receptacles as the platforms rotate.

Turning now to the balanced filler apparatus of the present invention which is illustrated in greater detail in FIGURES 2 through 6, a bowl 50 is provided for maintaining a supply of the product or liquid with which the receptacles 38 are to be filled. The bowl 50 is supported at a suitable height, such as several feet, above the receptacles to provide a gravity head or pressure for filling the receptacles. The bowl 50 includes a container having a cylindrical wall 51 which may be made of glass, and end plates 52 and 53. Suitable gaskets 54 and 55 may be provided between the wall 51 and the respective end plates 52 and 53 for sealing the container. The plate 52 has a hole in the center thereof and an end of a sleeve 56 is secured, as by welding, in the hole in the plate 52. A T fitting 57 is connected to the upper end of the sleeve 56 through a coupling 58, such as a hand operated coupling, which allows the sleeve 56 to rotate with respect to the fitting 57. The upper end or arm of the fitting 57 is coupled with a product supply pipe generally designated by a reference numeral 59. The leg of the fitting 57 is coupled to a vacuum pipe generally designated by reference numeral 60 which in turn is supported by bracket 61 (note FIGURE 1) secured to the frame 10 by means of a post 62. The fitting 57, supply pipe 59 and vacuum pipe are thus secured to the frame 10 and do not rotate.

The supply pipe 59 has a supply tube 64 connected thereto which extends through the arm of the T fitting 57 and the sleeve 56 into the bowl 50. The tube 64 supplies the product to the bowl 50 with which the receptacles 38 are to be filled; whereas the fitting 57 and sleeve 56 provide an annular space about the tube 64 communicating with the upper end of the bowl 50 for reducing the pressure in the upper portion or chamber thereof.

A float 68 is positioned within the bowl 50 and has a central passageway mounted coaxially with respect to the tube 64. The lower end of the float 68 includes a bracket 69 and resilient sealing member 70 mounted thereon for sealing with the lower end of the tube 64. When the product 71 raises to a predetermined level in the bowl, and consequently the float 68 rises to a predetermined level, the sealing member 70 seals with the lower end of the tube 64 to terminate filling of the bowl 50 from the supply tube 59.

The supply tube 59 is coupled with a nearby supply tank within in which the product is stored, and the vacuum tube 60 is coupled with a vacuum source, both being coupled in a conventional manner. The vacuum tube 60 and vacuum source serve to reduce the pressure in the upper portion or chamber of the bowl 50 thereby causing the product 71 to be drawn into the bowl from the supply tank through the supply tube 59. As will be explained in greater detail subsequently, a partial vacuum, which typically may be between nine to twenty-eight inches of mercury, is provided in the chamber of the bowl 50 which serves to aid in control of a filler valve device 47 according to the invention and to return overflow product to the bowl 50. The particular pressure of partial vacuum is chosen depending on the difficulty of drawing the product from its supply tank and the product head above the receptacles. Thus, a partial vacuum as high as twenty-five to twenty-eight inches of mercury may be required if it is difficult to draw the product from the supply tank; whereas if this is not difficult as little as around nine inches of mercury is sufficient for controlling the filler valve device in filling a receptacle.

A plurality of tubular fittings are secured to the plate 52 of the bowl 50 and extend through openings therein thereby communicating with the upper end or chamber in the bowl. The plate 53 has a central opening within which an end of a tube 76 is secured, as by welding. The tube 76 extends through and coaxial with the sleeve 28. The lower end of the tube 76 is connected to a manifold 77 which has a plurality of outlets 78. A plurality of flexible hoses 81, such as a hose 80, which are preferably formed of plastic, have one end connected with respective fittings 75 and extend through the annular space between the sleeve 28 and the tube 76 and exit at the bottom end of the sleeve 28. The hoses 80 couple the chamber in the bowl 50 to respective filler valve devices to supply a reduced pressure or vacuum thereto. Similar flexible hoses 81 are coupled with respective manifold outlets 78 to supply the product 71 from the bowl 50 to respective filler valve devices. A typical receptacle filling machine may include a member such as twenty, valve filler devices, in which case a like number of respective hoses 80 and 81 are provided for communicating therewith.

Turning now to FIGURES 3 through 6, a valve filler device 47 constructed in accordance with the concepts of the present invention includes a housing 90 having a threaded upper end 91 extending through an aperture in a bracket 92 and secured thereto by means of a nut 93. The bracket 92 is secured to the lower end of the valve support rod 45 by means of a nut 94. The housing 90 is thus caused to move up or down with the rod 45 by the action of the cam follower arrangement described previously.

The housing 90 has an upper bore 96, defining a chamber, a lower bore 97 defining a chamber, and a neck 98 intermediate the bores having an opening therethrough. A fitting 99 is screwed into the upper end of the housing 90 and communicates with the bore 90 for receiving the end of the vacuum hose 80.

A tip fitting 100 is threaded onto the lower end of the housing 90 and sealed with respect thereto by a sealing ring 102. The tip fitting 100 includes a tip 103 having a bore 104 communicating with the bore 97 in the housing 90, and an opening through the center thereof within which a hollow vacuum tube 105 may pass. The tip 103 further includes a plurality of inclined passageways 107 communicating with the bore 104 and thus the bore 97. The hollow tube 105 is secured with respect to the housing 90 at the neck 98 thereof by means of a set screw 109 having a resilient plug 110 extending from the end thereof to press against the tube 105. The tube 105 thus may be adjusted up and down by loosening the set screw 109. As will appear subsequently, the extent to which the tube 105 extends from the tip 103 determines the fill level of the receptacle 38.

The housing 90 has a bore 112 in a side thereof communicating with the chamber defined by the bore 97. A sleeve 113 communicates with the bore 112 and is secured to the housing 90 in any suitable manner, such as by welding. A ball check valve, generally designated by reference numeral 114, includes a body 115 having an opening 116 in a side thereof communicating with the interior of the tube 113. The tube 113 may be secured to the body 115 by welding. The body 115 includes a central bore 117 communicating with the opening 116, and thus through the tube 113 with the bore 97 in the housing 90. The body 115 has an end 118 of reduced diameter which has a bore 119 therethrough with smaller diameter than the bore 117 thereby providing a valve seat 120. A steel ball 121 is positioned within the bore 117 to seat with the valve seat 120. The product supply hose 81 is secured on the end 118 of the body 115 by means of a clamp 122, or the like. The upper end of the body 115 is closed by means of a screw plug 124 and a sealing ring 125.

A sleeve 130 is mounted on the exterior of the housing 90 and includes elongated slots 131 and 132 therein in the vicinity of the tube 113 and set screw 109, respectively, to allow the sleeve 130 to freely move up and down with respect to the housing 90. The lower end of the sleeve 130 includes an opening 134 and a beveled surface 135 for appropriately positioning the upper end 136 of the receptacle 38. A resilient sleeve 137 is mounted on the lower end of the tip fitting 100, and the lower end of the sleeve abuts with and forms a seal with the top 138 of the receptacle 38 when the housing 90 is lowered by the rod 45.

As the filler valve device is moved to a position above the receptacle 38, it is lowered by the cam follower mechanism described previously thereby allowing the sleeve 130 to position the receptacle 38 with respect to the lower end of the filler valve device, following which the lower end of the sleeve 137 seals with the bottle top 138. When the filler valve device is in its upper position, i.e., before sealing with the top of the receptacle 38, the chamber defined by the bore 97 in the housing 90 is at atmospheric pressure; whereas partial vacuum or reduced pressure exists in the upper end of the bowl 50. This results in a pressure unbalance across the ball check valve 114 which causes the ball 121 to remain seated on the valve seat 120 thus preventing the product 71 from passing the valve seat and flowing through the tube 113 and the bore 97 to the tip 103.

When the resilient sleeve 137 seals with the top 138 of the receptacle 38, the vacuum tube 105 begins evacuating the receptacle 38. Subsequently, the pressure in the receptacle 38, and thus within the bore 97, tube 113 and bore 117 is reduced allowing the product 71 to flow through the ball check valve 114 by gravity pressure. The product flows through the hose 81, through the ball check valve 114 past the ball 121, through the tube 113, through the annular chamber defined by the bore 97 and the tube 105, and through the inclined passageways 107 into the receptacle 38. The inclined passageways 107 provide a type of swirl feed essentially down the interior surface of the receptacle 38 to thereby reduce splashing. The product 71 fills the receptacle 38 to a level determined by the position of the lower end of the vacuum tube 105.

When the level of the product 71 within the receptacle 38 reaches the lower end of the vacuum tube 105 any potential overflow is returned through the tube 105 and vacuum hose 80 to the bowl 50. As the overflow product returns to the bowl 50, the hydraulic head of the product in the tube 105 and the hose 80 increases, and the fluid circuit again becomes balanced. When this occurs, the ball 121 drops against the valve seat 120 thereby stopping the flow of product through the ball check valve 114. When the filler valve device is raised, atmospheric pressure again exists on the tube 113 side of the ball check valve 114 and hence the ball check valve remains closed. This operation is repeated for the filling of each receptacle 38.

Thus it will be seen that receptacles may be filled automatically without the requirement of complex mechanical or pneumatic valve control mechanisms or fluid pumps. The present invention is particularly useful for filling glass bottles with non-sudsing liquids, particularly liquid food products.

It will be understood that although an exemplary embodiment of the present invention has been disclosed and discussed, other configurations, structural arrangements and applications are possible and that the embodiment disclosed may be subjected to various changes, modifications, and substitutions without necessarily departing from the spirit of the invention.

What is claimed is:

1. A receptacle filling machine for supplying a fluid to a plurality of receptacles comprising:
   supporting frame means having an open support member,
   rotatable container means for holding a supply of a fluid above a plurality of receptacles, said container means including an elongated outlet tube extending therefrom and extending through said support member, a stationary fluid inlet extending into said container means for supplying fluid thereto, valve means responsive to the level of fluid in said container means for closing said inlet and terminating flow of fluid into said container means when the fluid reaches a predetermined level therein, said container means including an enclosed chamber above the level of said fluid, and said container means having a second inlet for reducing the pressure within said chamber for causing said fluid to flow into said container means through said stationary inlet,
   a rotatable coupling coupled between said second inlet of said container means and a tube member adapted to be coupled to a source of reduced pressure, said stationary fluid inlet extending coaxially through said second inlet and said coupling,
   manifold means coupled with the lower end of said elongated outlet tube,
   a plurality of filler valve means for evacuating and filling respective receptacles, each of said filler valve means including a first chamber communicating with a first opening in a tip at an end thereof for supplying fluid to a receptacle and having a second chamber communicating with a second opening in said tip for reducing the pressure within a receptacle,
   a plurality of flexible tubes respectively coupling said plurality of filler valve means with said manifold means, said flexible tubes communicating with the first chamber of said respective filler valve means,
   a second plurality of flexible tubes coupled between said container means and the second chamber in said respective filler valve means and extending between said support member and said elongated outlet tube of said container means, said second plurality of flexible tubes communicating the pressure level of the chamber in said container means to the second chamber of respective filler valve means for reducing the pressure within respective receptacles for causing the fluid to be drawn into the receptacles and for returning overflow fluid to said container means,
   table means for carrying said receptacles,
   means for causing said container means, said filler valve means and said table means to rotate together, and
   control means for moving said filler valve means into engagement with respective receptacles.

2. A receptacle filling machine for supplying a fluid to a plurality of receptacles comprising:
   supporting frame means having an open support member,
   rotatable container means for holding a supply of a fluid above a plurality of receptacles, said container means including an elongated outlet tube extending therefrom and extending through said support member, a stationary fluid inlet extending into said container means for suplying fluid thereto, valve means responsive to the level of fluid in said container means for closing said inlet and terminating flow of fluid into said container means when the fluid reaches a predetermined level therein, said container means including an enclosed chamber above the level of said fluid, and said container means having a second inlet for reducing the pressure within said chamber for causing said fluid to flow into said container means through said stationary inlet,
   a rotatable coupling coupled between said second inlet of said container means and a tube member adapted to be coupled to a source of reduced pressure, said stationary fluid inlet extending coaxially through said second inlet and said coupling,
   manifold means coupled with the lower end of said elongated outlet tube,
   a plurality of filler valve means for evacuating and filling respective receptacles, each of said filler valve means including a first chamber communicating with a plurality of openings in a tip at an end thereof for supplying fluid to a receptacle, said plurality of openings being inclined at an angle and offset with respect to the longitudinal axis of the filler valve means to provide a swirl-type feed of fluid to the interior wall of a receptacle, and each of said filler valve means having a second chamber communicating with a second opening in said tip for reducing the pressure within a receptacle, a plurality of flexible tubes respectively coupling said plurality of filler valve means with said manifold means, said flexible tubes communicating with the first chambers of said respective filler valve means, a second plurality of flexible tubes coupled between said container means and the second chamber in said respective filler valve means and extending between said support member and said elongated outlet tube of said container means, said second plurality of flexible tubes communicating the pressure level of the chamber in said container means to the second chamber of respective filler valve means for reducing the pressure within respective receptacles for causing the fluid to be drawn into the receptacles and for returning overflow fluid to said container means, table means for carrying said receptacles, means for causing said container means, said filler valve means and said table means to rotate together, and control means for moving said filler valve means into engagement with respective receptacles.

3. A receptacle filling machine for supplying a fluid to a plurality of receptacles comprising:

supporting frame means having an open support member, rotatable container means for holding a supply of a fluid above a plurality of receptacles, said container means including an elongated outlet tube extending therefrom and extending through said support member, a stationary fluid inlet extending into said container means for supplying fluid thereto, valve means responsive to the level of fluid in said container means for closing said inlet and terminating flow of fluid into said container means when the fluid reaches a predetermined level therein, said container means including an enclosed chamber above the level of said fluid, and said container means having a second inlet for reducing the pressure within said chamber for causing said fluid to flow into said container means through said stationary inlet, a rotatable coupling coupled between said second inlet of said container means and a tube member adapted to be coupled to a source of reduced pressure, said stationary fluid inlet extending coaxially through said second inlet and said coupling, manifold means coupled with the lower end of said elongated outlet tube, a plurality of filler valve means for evacuating and filling respective receptacles, each of said filler valve means including a first chamber communicating with a first opening in a tip at an end thereof for supplying fluid to a receptacle and having a second chamber communicating with a second opening in said tip for reducing the pressure within a receptacle, a plurality of tubes respectively coupling said plurality of filler valve means with said manifold means, said tubes communicating with the first chamber of said respective filler valve means, a second plurality of tubes coupled between said container means and the second chamber in said respective filler valve means and extending between said support member and said elongated outlet tube of said container means, said second plurality of tubes communicating the pressure level of the chamber in said container means to the second chamber of respective filler valve means for reducing the pressure within respective receptacles for allowing the fluid to flow into the receptacles and for returning overflow fluid to said container means, table means for carrying said receptacles, means for causing said container means, said filler valve means and said table means to move together, and control means for engaging said filler valve means with respective receptacles.

References Cited

UNITED STATES PATENTS

| 1,572,150 | 2/1926 | Kiefer | 141—59 |
| 2,136,421 | 11/1938 | Everett | 141—59 X |
| 2,261,705 | 11/1941 | Weaver | 141—59 X |
| 2,263,551 | 11/1941 | Armstrong et al. | 141—59 X |
| 2,349,780 | 5/1944 | Weinreich et al. | 141—59 |
| 2,660,357 | 11/1953 | Fechheimer | 141—59 X |
| 2,675,951 | 4/1954 | Domeneck Oriol | 141—59 X |

FOREIGN PATENTS

| 960,061 | 6/1964 | Great Britain. |
| 2,529 | 1/1914 | Great Britain. |

LAVERNE D. GEIGER, Primary Examiner

EDWARD J. EARLS, Assistant Examiner

U.S. Cl. X.R.

141—145, 289